US009632476B2

(12) United States Patent
Yoshida et al.

(10) Patent No.: US 9,632,476 B2
(45) Date of Patent: Apr. 25, 2017

(54) CHASSIS STRUCTURE, OPTICAL SCANNING DEVICE, AND IMAGE FORMING APPARATUS

(71) Applicants: Daisuke Yoshida, Kanagawa (JP); Takashi Yamakawa, Kanagawa (JP)

(72) Inventors: Daisuke Yoshida, Kanagawa (JP); Takashi Yamakawa, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 0 days.

(21) Appl. No.: 14/923,614

(22) Filed: Oct. 27, 2015

(65) Prior Publication Data

US 2016/0147193 A1    May 26, 2016

(30) Foreign Application Priority Data

Nov. 20, 2014    (JP) .................................. 2014-235516

(51) Int. Cl.
*G03G 21/16* (2006.01)
*G03G 15/04* (2006.01)
*H04N 1/00* (2006.01)
*H04N 1/06* (2006.01)

(52) U.S. Cl.
CPC ... *G03G 21/1619* (2013.01); *G03G 15/04036* (2013.01); *G03G 21/1666* (2013.01); *H04N 1/00559* (2013.01); *H04N 1/0607* (2013.01)

(58) Field of Classification Search
None
See application file for complete search history.

(56) References Cited

U.S. PATENT DOCUMENTS

| | | |
|---|---|---|
| 2006/0209376 A1 | 9/2006 | Yamakawa et al. |
| 2007/0070173 A1 | 3/2007 | Yamakawa et al. |
| 2007/0122192 A1 | 5/2007 | Yamakawa et al. |
| 2007/0134023 A1 | 6/2007 | Shoji et al. |
| 2007/0139745 A1 | 6/2007 | Shoji et al. |
| 2007/0165099 A1 | 7/2007 | Yoshizawa et al. |
| 2007/0252077 A1 | 11/2007 | Shoji et al. |
| 2009/0185846 A1 | 7/2009 | Okamoto |

(Continued)

FOREIGN PATENT DOCUMENTS

| | | |
|---|---|---|
| JP | H10322046 A | 12/1998 |
| JP | 2000098287 A | 4/2000 |

(Continued)

OTHER PUBLICATIONS

Extended European Search Report dated Apr. 1, 2016.

*Primary Examiner* — David Gray
*Assistant Examiner* — Thomas Giampaolo, II
(74) *Attorney, Agent, or Firm* — Harness, Dickey & Pierce, P.L.C.

(57) ABSTRACT

A chassis structure includes: a chassis that houses a component used for an image forming apparatus inside and that includes an opening; a cover member that covers the opening of the chassis; and a seal member that is provided between the cover member and the chassis and that, when the cover member is attached to the chassis, is compressed and deformed so as to seal a gap between the cover member and the chassis. An attached section of the cover member to which the seal member is attached is provided with a hole.

20 Claims, 5 Drawing Sheets

(56) References Cited

U.S. PATENT DOCUMENTS

| | | | |
|---|---|---|---|
| 2009/0226213 A1* | 9/2009 | Mogi | B41J 2/473 399/132 |
| 2009/0295899 A1 | 12/2009 | Watanabe et al. | |
| 2010/0033787 A1 | 2/2010 | Serizawa et al. | |
| 2010/0134854 A1 | 6/2010 | Murakami et al. | |
| 2011/0199663 A1 | 8/2011 | Johno et al. | |
| 2011/0199664 A1 | 8/2011 | Serizawa et al. | |
| 2011/0316958 A1 | 12/2011 | Johno et al. | |
| 2013/0135419 A1* | 5/2013 | Otoguro | G03G 15/04036 347/224 |
| 2013/0308171 A1 | 11/2013 | Mogi | |

FOREIGN PATENT DOCUMENTS

| | | |
|---|---|---|
| JP | 2009-173365 | 8/2009 |
| JP | 2009-179441 | 8/2009 |
| JP | 2014-012368 | 1/2014 |

* cited by examiner

CHASSIS STRUCTURE, OPTICAL SCANNING DEVICE, AND IMAGE FORMING APPARATUS

CROSS-REFERENCE TO RELATED APPLICATIONS

The present application claims priority to and incorporates by reference the entire contents of Japanese Patent Application No. 2014-235516 filed in Japan on Nov. 20, 2014.

BACKGROUND OF THE INVENTION

1. Field of the Invention

The present invention relates to a chassis structure, an optical scanning device, and an image forming apparatus.

2. Description of the Related Art

In electrophotographic image forming apparatuses, optical image information is formed on a previously uniformly charged image bearer, such as a photoconductor, by an optical scanning device so that an electrostatic latent image is obtained, the electrostatic latent image is visualized by using toner from a developing device, a visible image is transferred onto a recording medium, such as a transfer sheet, directly or via an intermediate transfer member, such as an intermediate transfer belt, an unfixed toner image on the recording medium is fixed by a fixing device that uses pressure, heat, and/or the like, whereby an image is formed. The optical scanning device uses an LD array (hereinafter, referred to as the LDA), a vertical-cavity surface-emitting laser (hereinafter, referred to as the VCSEL), or the like, and thus the quality/the image quality has been enhanced by increasing channels of luminous points.

It is already known that, in this type of optical scanning device of the image forming apparatus, faulty images (image voids, or the like,) occur due to contamination of an optical element, or the like, with dusts, foreign matters, or the like.

To solve such a problem, there is a known structure in which a sponge member, which is a seal member, is compressed and installed between an optical housing and a cover member that covers an opening of the optical housing, whereby the entry of a foreign matter, or the like, is prevented (for example, see Japanese Laid-open Patent Publication No. 2014-12368).

However, the optical scanning device of the image forming apparatus that is described in Japanese Laid-open Patent Publication No. 2014-12368 has a problem in that, as the seal member is complicated or is divided into multiple pieces by necessity, the yield rate of sheet materials is low and the costs are increased. Furthermore, as seal members have a joint line, a clearance occurs at the joint line, which results in a problem of a reduction in the sealing capability. Furthermore, there is a possibility that a sponge member is fragmented due to hydrolysis that is caused by water (moistures), or the like, with the passage of time, and the fragmented sponge member enters the image forming apparatus as a foreign matter. As a result, there is a problem of the occurrence of faulty images, such as image voids.

There is a need to provide a chassis structure that has a simple configuration and that ensures the sealing performance of a chassis with the passage of time.

SUMMARY OF THE INVENTION

It is an object of the present invention to at least partially solve the problems in the conventional technology.

A chassis structure includes: a chassis that houses a component used for an image forming apparatus inside and that includes an opening; a cover member that covers the opening of the chassis; and a seal member that is provided between the cover member and the chassis and that, when the cover member is attached to the chassis, is compressed and deformed so as to seal a gap between the cover member and the chassis. An attached section of the cover member to which the seal member is attached is provided with a hole.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
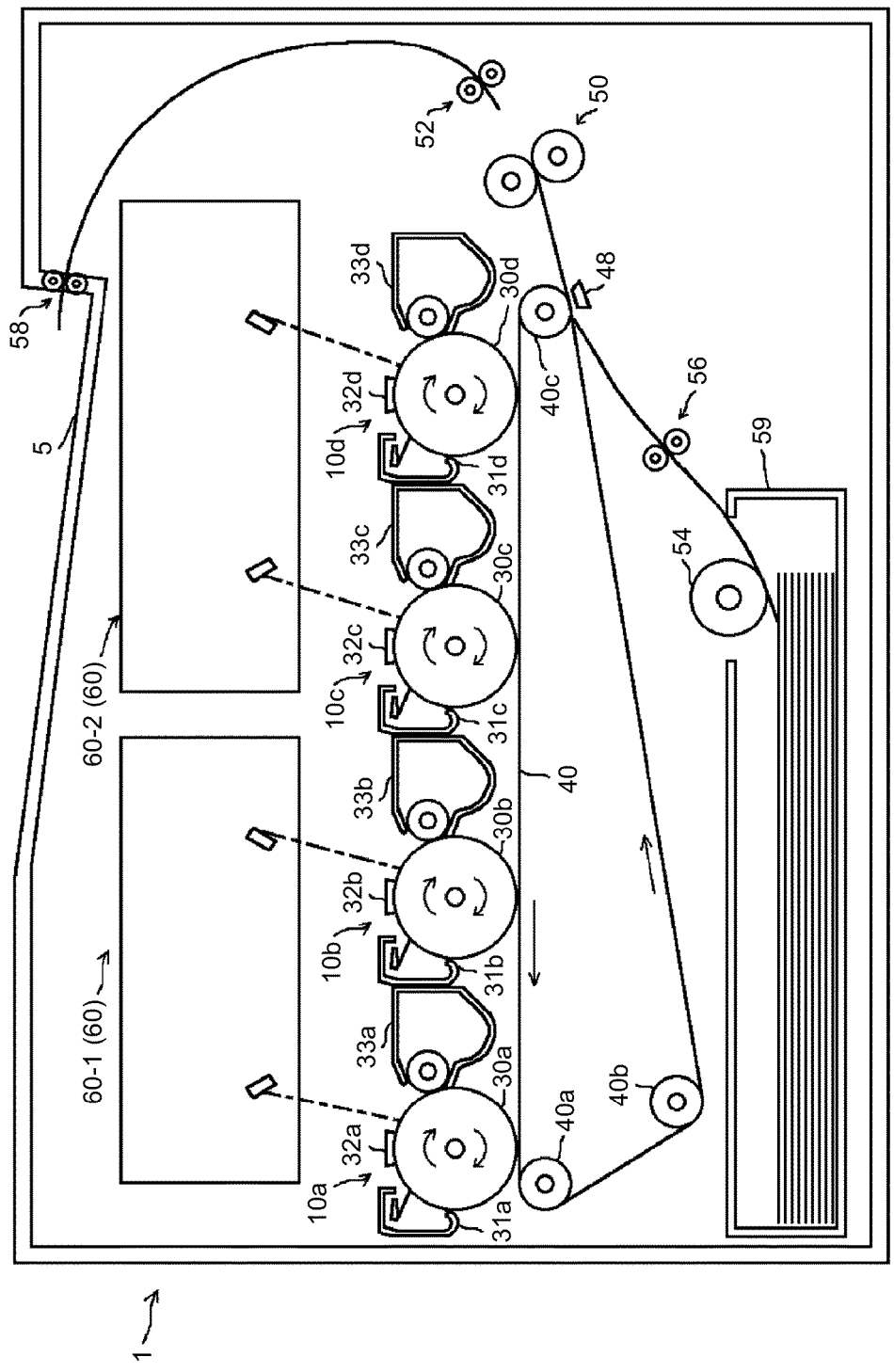
FIG. 1 is a configuration diagram that schematically illustrates an image forming apparatus according to an embodiment of the present invention.

With reference to the attached drawings, an explanation is given below of an embodiment of the present invention. Here, in the drawings that illustrate the embodiment of the present invention, the same reference numerals are applied to components such as members or constituent parts that have the same functionality or shape as long as they can be discriminated from one another and, after they are explained once, their explanations are omitted.

First, an explanation is given, with reference to FIG. 1, of a configuration of an image forming apparatus 1 that is provided with an optical scanning device 60 according to the present invention. FIG. 1 illustrates a schematic cross-sectional view of a full-color printer that is an example of the image forming apparatus.

The image forming apparatus 1, which is illustrated in FIG. 1, includes an electrophotographic image forming part, and the image forming part includes four image forming units 10a, 10b, 10c, and 10d. The first to fourth image forming units 10a, 10b, 10c, and 10d have the same configuration; however, they are different only in the corresponding toner color, and each of the image forming units forms, for example, black toner images, magenta toner images, cyan toner images, or yellow toner images. Here, the image forming units have the same configuration except that they have different developer (toner) colors; therefore, in the following explanation, they are explained without the accompanied characters a, b, c, and d as appropriate.

An image forming unit 10 is provided with a photoconductor 30 that is a drum-shaped image bearer. A charging member 32, a developing device 33, and a cleaning device 31 are provided around the photoconductor 30. The photoconductor 30 can be driven to rotate in a clockwise direction and, when a predetermined bias voltage is applied to the charging member 32, the surface of the photoconductor 30, which is driven to rotate, can be uniformly charged. Here, the non-contact type charging member 32 that uses corona discharge, or the like, is used; however, it is possible to use a roller-shaped member that is in contact with the photoconductor 30.

The optical scanning device 60 is located above the four image forming units 10. The optical scanning device 60 includes an M-Y unit 60-1 that performs exposure and scanning on photoconductor drums 30a and 30b and a Bk-C unit 60-2 that performs exposure and scanning on photoconductor drums 30c and 30d. The optical scanning device 60 causes the surface of the corresponding photoconductor drum 30 to be irradiated with a scanning light due to lighting control based on image information, thereby forming electrostatic latent images. After an electrostatic latent image is formed on the photoconductor 30 by the optical scanning device 60, it is passed by the developing device 33 in accordance with the rotation of the photoconductor 30 so that it is developed with applied toner of each color, whereby it is visualized.

An endless-belt type intermediate transfer belt 40, which is configured as an intermediate transfer member, is provided such that it is opposed to the photoconductor 30 of each of the image forming units 10. Each of the photoconductors 30 is in contact with the surface of the intermediate transfer belt 40. The intermediate transfer belt 40 is configured such that it is wrapped around multiple support rollers (40a, 40b, and 40c), and the support roller 40c is connected to a drive motor that is a driving source. When the drive motor is driven, the intermediate transfer belt 40 is moved and rotated in a counterclockwise direction in the drawing (see the direction of the arrow in FIG. 1), and the support rollers 40a and 40b, which can be driven to rotate, are driven to rotate in accordance with the rotation of the intermediate transfer belt 40. Furthermore, a primary transfer roller is provided on the back surface of the intermediate transfer belt 40 such that it is opposed to the photoconductor 30 with the belt interposed therebetween. A primary transfer bias is applied to the primary transfer roller from a high-voltage power source so that a toner image, which has been developed by the developing device 33, is primarily transferred onto the intermediate transfer belt 40. Furthermore, as for the primary-transfer residual toner that has not been primarily transferred and that remains on the photoconductor 30, it is removed by a cleaning blade that is provided in the cleaning device 31 so that it stands by for the next image forming operation by the photoconductor 30.

In the image forming apparatus 1, a secondary transfer charger 48 is provided as a secondary transfer device at the position that is opposed to the support roller 40c with the intermediate transfer belt 40 interposed therebetween. The secondary transfer charger 48 is located away from the intermediate transfer belt 40 by a predetermined distance. The voltage with the polarity opposite to that of the charging member 32 is applied to the secondary transfer charger 48.

The image forming apparatus 1 includes a pair of registration rollers (a pair of position setting rollers) 56, or the like, in addition to a sheet feeding cassette 59 on which a recording medium is stacked and a sheet feeding roller 54. Furthermore, a fixing device 50 is located downstream of the secondary transfer charger 48 with respect to the conveying direction of the recording medium, and it includes a pair of rollers, i.e., a pressing roller and a heating roller, and applies heat and pressure to a recording medium to fix an unfixed toner image to the recording medium. On the downstream side thereof with respect to the conveying direction are provided a pair of conveyance rollers 52, a pair of paper ejection rollers 58, or the like, that ejects a recording medium, which is delivered from the fixing device 50, to a recording-medium discharge unit, such as a paper ejection tray 5.

Next, an explanation is given of an image forming operation by the image forming apparatus. All the configurations for forming a toner image on each of the photoconductors 30 and transferring the toner image to the intermediate transfer belt 40 during the image forming operation are substantially the same except that the colors of toner images are different; therefore, the accompanied characters a, b, c, and d are omitted as appropriate.

When an image formation signal is received from a personal computer, or the like, the photoconductor 30 is started to be driven and rotated in a clockwise direction by a driving source. At this point, the surface of the photoconductor 30 is irradiated with a light from a neutralization device so that the surface potential is initialized. After the surface potential is initialized, the surface of the photoconductor 30 is uniformly charged by the charging member 32 so as to have a predetermined polarity. The charged surface of the photoconductor 30 is irradiated with a laser light from the optical scanning device 60. Thus, a desired electrostatic latent image is formed on the surface of the photoconductor 30. Furthermore, the image information with which the optical scanning device 60 conducts exposure and optical scanning on each of the photoconductors 30 is the single-color image information that is obtained by separating a desired full-color image into each piece of toner color information of yellow, cyan, magenta, and black. When the electrostatic latent image formed on the photoconductor 30 as described above is passed by the developing device 33, each color toner (developer) is applied to the electrostatic latent image from the developing device 33, whereby it is visualized as a developed toner image.

The intermediate transfer belt 40 is driven to move in a counterclockwise direction in the drawing. The primary transfer voltage that is applied to the primary transfer roller has the polarity opposite to the toner charging polarity of the toner image that is formed on the photoconductor 30. Due to the effect of the primary transfer voltage, a primary-transfer electric field is formed between the photoconductor 30 and the intermediate transfer belt 40. The toner image on the photoconductor 30 is electrostatically and primarily transferred onto the intermediate transfer belt 40 that is driven to rotate in synchronization with the photoconductor 30. The toner image of each color, which is primarily transferred as described above, is sequentially superimposed on the intermediate transfer belt 40 in synchronized timing, starting from the upstream side of the intermediate transfer belt 40 with respect to the conveying direction, whereby a desired full-color toner image is formed on the intermediate transfer belt 40.

Furthermore, a recording medium on which an image is to be formed is appropriately separated one by one from the bundle of recording media that is stacked on the sheet feeding cassette 59 due to the action of an appropriate conveying member, such as the sheet feeding roller 54, until the pair of registration rollers 56. After a recording medium is individually separated, it is conveyed to the nip section of the pair of registration rollers 56 that have not started to be driven to rotate yet. The end of the conveyed recording medium is brought into contact with the nip section of the pair of registration rollers 56, and what is called a loop is formed, whereby a registration is conducted on the recording medium.

Afterward, the pair of registration rollers 56 starts to be driven to rotate in synchronized timing with the full-color toner image that is borne on the intermediate transfer belt 40. Then, the recording medium is delivered toward the secondary transfer unit that includes the secondary transfer charger 48 that is opposed to the support roller 40*c* with the intermediate transfer belt 40 interposed therebetween by a predetermined space. A predetermined transfer voltage is applied to the secondary transfer charger 48 so that the full-color toner image that is formed on the surface of the intermediate transfer belt 40 is collectively transferred onto the recording medium.

After the toner image is transferred onto the recording medium, the recording medium is conveyed to the fixing device 50 and, when it is passed by the fixing device 50, heat and pressure are applied to it by the fixing device 50, whereby a semipermanent full-color image is fixed to the recording medium. After the image is fixed to the recording medium by the fixing device 50, the recording medium is discharged to the recording-medium discharge unit, such as the paper ejection tray 5, via the pair of conveyance rollers 52, the pair of paper ejection rollers 58, or the like. Furthermore, the residual toner, which is not transferred by the secondary transfer unit that is provided with the secondary transfer charger 48 and which remains on the intermediate transfer belt 40, is removed and collected by an intermediate-transfer belt cleaning unit.

An explanation is given of a configuration of the optical scanning device 60. The optical scanning device 60 includes the M-Y unit 60-1 that conducts exposure scanning on the photoconductor drums 30*a* and 30*b* and the Bk-C unit 60-2 that conducts exposure scanning on the photoconductor drums 30*c* and 30*d*. As the M-Y unit 60-1 and the Bk-C unit 60-2 have the same optical axis layout, the Bk-C unit 60-2 is explained, and the explanation of the M-Y unit 60-1 is omitted.

Figure 2:
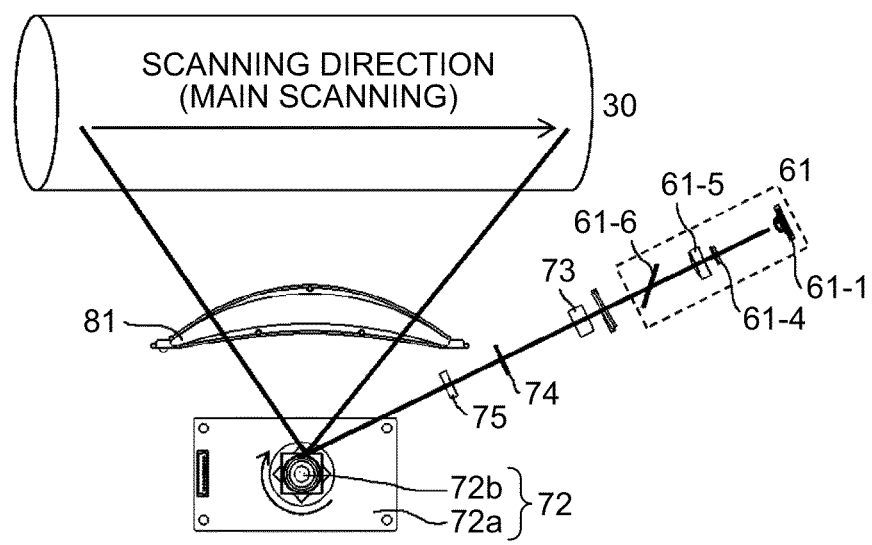
FIG. 2 is a configuration diagram that schematically illustrates an optical incidence system of the image forming apparatus that is illustrated in FIG. 1.

FIG. 2 is a configuration diagram that schematically illustrates an optical incidence system of the Bk-C unit 60-2. A light source unit 61 that emits a laser light includes a light source 61-1 that emits a laser light by using a linearly-polarized light; a ¼ wave plate 61-4 that converts a laser light into a circularly-polarized light; a collimator lens 61-5 that converts the laser light on which polarization conversion has been performed by the ¼ wave plate into a parallel light; and an aperture 61-6 that obtains the parallel laser light. The light source 61-1 is, for example, a laser diode (LD), a laser diode array (LDA), or a vertical-cavity surface-emitting laser (VCSEL), and it includes multiple emission points. These optical elements are assembled and held within a light-source holder in an integrated manner. After a laser light is emitted from the light source unit 61, it passes through the optical incidence system and enters a deflector 72 that is an optical deflecting unit.

The optical incidence system, which forms a beam profile, includes a prism beam splitter (PBS) 73 that splits the laser light, which is emitted from the light source unit 61, in two directions on the sub-scanning cross-sectional surface; a ¼ wave plate 74 that converts a linearly-polarized light into a circularly-polarized light with regard to polarization of the laser that has been split in two directions; and a cylindrical lens (CYL) 75 that obtains the power only on the sub-scanning cross-sectional surface with respect to a laser light, which has been converted into a circularly-polarized light, and that focuses it on the mirror surface of a rotary polygon mirror 72*b* that is provided in the deflector 72.

After a laser light is formed by the optical incidence system, it is focused on the mirror surface of each of the rotary polygon mirrors 72*b* of the deflector 72. The deflector 72 drives the rotary polygon mirror 72*b* at a desired rotating speed in a stable manner. As described above, as a laser light enters the mirror surface of the rotary polygon mirror 72*b*, scanning is conducted with the laser light in a main-scanning direction.

Figure 3:
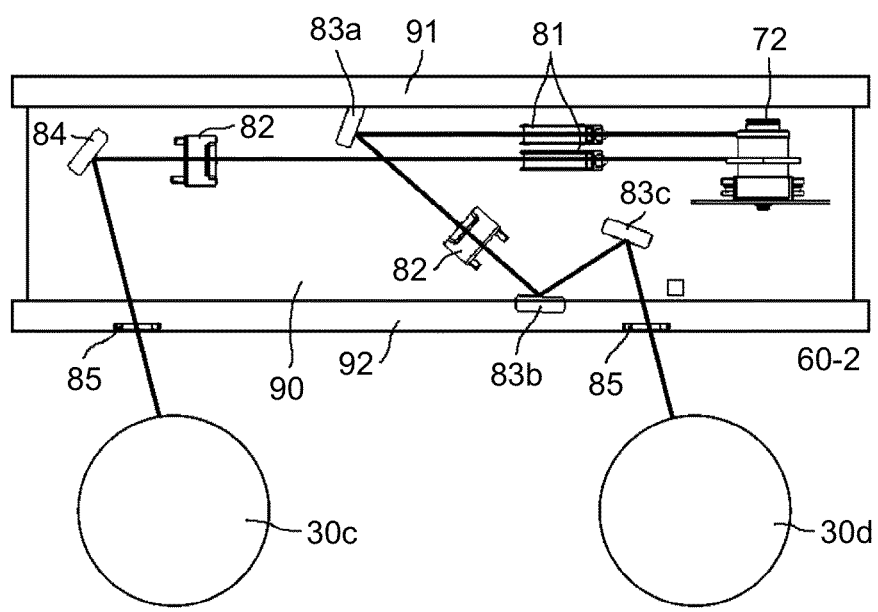
FIG. 3 is a configuration diagram that schematically illustrates an optical scanning system of the image forming apparatus that is illustrated in FIG. 1.

FIG. 3 is a configuration diagram that schematically illustrates the optical scanning system. A laser light, with which the rotary polygon mirror 72*b* in the upper tier is scanned, passes through a first output lens (L1) 81, a second output lens (L2) 82, and a dust prevention glass 85 so that the surface of the photoconductor drum 30 is scanned at a constant speed, whereby an electrostatic latent image is formed. On the optical path are provided mirrors 83*a*, 83*b*, and 83*c* that reflect a laser light.

Furthermore, a laser light, with which the rotary polygon mirror 72*b* in the lower tier is scanned, passes through the first output lens 81, the second output lens 82, and the dust prevention glass 85 so that the surface of the photoconductor drum 30 is scanned at a constant speed, whereby an electrostatic latent image is formed. On the optical path is provided a mirror 84 that reflects a laser light. The optical scanning system, the optical incidence system, and the deflector are integrally attached to an optical housing 90, whereby the characteristics of the optical scanning device 60 are ensured.

Figure 4:
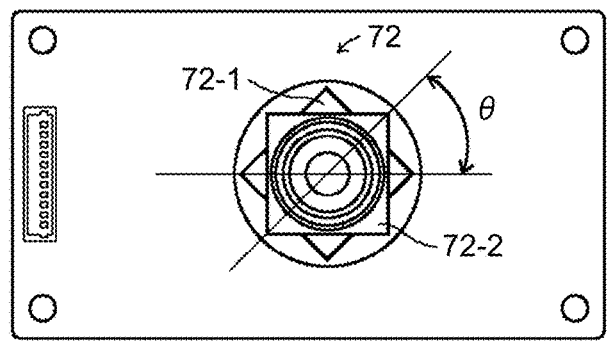
FIG. 4 is a configuration diagram that schematically illustrates a deflector of the image forming apparatus that is illustrated in FIG. 1.

As illustrated in FIG. 4, the deflector 72 is provided with the rotary polygon mirror 72*b*, and it is attached to a motor board 72*a*. The rotary polygon mirror 72*b* includes four mirror surfaces, and it has a two-tier structure. An upper tier 72-2 and a lower tier 72-1 of the rotary polygon mirror 72*b* are formed such that they are shifted by θ in a rotation direction. Here, although θ=45° according to the present embodiment, there is no limitation on this configuration. The upper tier 72-2 of the rotary polygon mirror 72*b* conducts scanning on the photoconductor drum 30*d*, and the lower tier 72-1 of the rotary polygon mirror 72*b* conducts scanning on the photoconductor drum 30*c*. They do not conduct scanning simultaneously due to their geometries, and they are configured to conduct exposure scanning on the basis of the image information that corresponds to each station.

Figure 5:
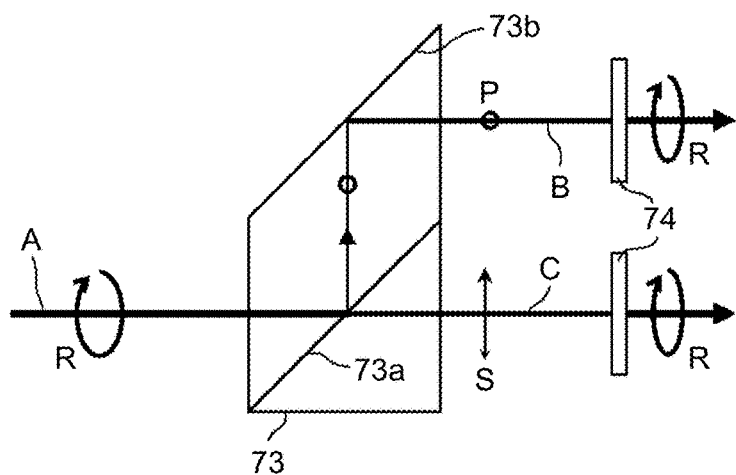
FIG. 5 is an explanatory diagram that illustrates a prism beam splitter of the image forming apparatus that is illustrated in FIG. 1.

FIG. 5 is an explanatory diagram that illustrates the prism beam splitter 73 that splits a laser light into two. After a laser light (a light flux A) is emitted from the light source unit 61, it is converted from a linearly-polarized light into a circularly-polarized light by the ¼ wave plate 61-4 of the light source unit 61. When the laser light (the light flux A), which has the characteristics of circularly-polarized light, reaches a polarization separation surface 73a of the prism beam splitter 73, only the S polarized light that is the component perpendicular to the mirror surface (reflection surface) of the rotary polygon mirror 72b is transmitted through the polarization separation surface 73a among the polarization components of the circularly-polarized light.

Furthermore, when the laser light (the light flux A), which has the characteristics of circularly-polarized light, reaches the polarization separation surface 73a of the prism beam splitter 73, the P polarized light that is the component parallel to the mirror surface (reflection surface) of the rotary polygon mirror 72b is reflected by the polarization separation surface 73a among the polarization components of the circularly-polarized light. After the laser light is reflected by the polarization separation surface 73a, it is reflected by a reflection mirror surface 73b of the prism beam splitter 73. In this way, the single laser light is split into two laser lights that have different polarization characteristics (hereinafter, referred to as the light flux split). After each laser light is subjected to the light flux split, it is transmitted through the prism beam splitter 73 and is then converted into a circularly-polarized light again by the ¼ wave plate 74.

Figure 6:
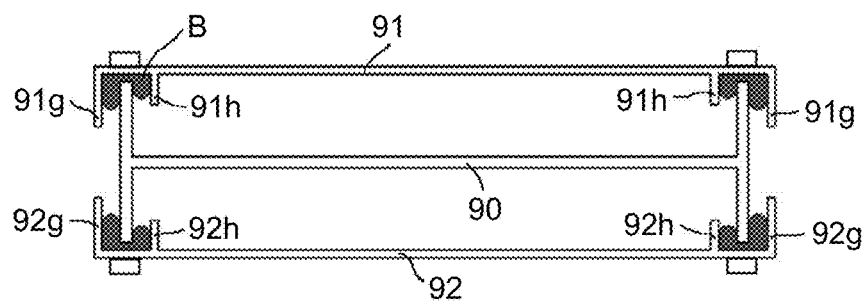
FIG. 6 is an explanatory diagram that illustrates a sealing structure of the image forming apparatus that is illustrated in FIG. 1.

Next, a detailed explanation is given of the sealing structure of the optical scanning device 60 that is the characteristic structure according to the present invention. FIG. 6 is an explanatory diagram that illustrates the sealing structure of the optical scanning device 60. A first cover member 91 and a second cover member 92 are attached to openings of the optical housing 90 that houses each optical element inside. A viscoelastic member B, which is a seal member made of a resin, synthetic rubber, or the like, is interposed in the gap that is present between the cover members 91, 92 and the optical housing 90, whereby the sealing performance is ensured. Here, the number of cover members is not limited to this configuration, and it may be at least one.

The first cover member 91 and the second cover member 92 are the members to which the viscoelastic member B is attached. The cover members 91 and 92 have a box shape with an opening that is formed on one surface, and they include outer wall sections 91g and 92g that rise from the outer circumference of the bottom section. Furthermore, they include inner wall sections 91h and 92h that are provided inside the outer wall sections 91g and 92g.

Furthermore, while the viscoelastic member B is heated, it is poured by a melter, or the like, and is cooled so as to be hardened in the area that is surrounded by the outer wall sections 91g, 92g of the cover members 91, 92, the inner wall sections 91h, 92h, and attached surfaces 91e, 92e that are on the bottom section and that are sandwiched between the outer wall sections 91g, 92g and the inner wall sections 91h, 92h. Thus, the viscoelastic member B is attached to the first cover member 91 and the second cover member 92. The attached sections of the viscoelastic member B are the outer wall sections 91g, 92g, the inner wall sections 91h, 92h, and the attached surfaces 91e, 92e.

Furthermore, in image forming apparatuses that use a deflector, the deflector and the light source (laser diode (LD), a laser diode array (LDA), a vertical-cavity surface-emitting laser (VCSEL), or the like) are often replaced due to the operating life, degradation, or the like. When the deflector or the light source is to be replaced, it is necessary to remove the first cover member 91 or the second cover member 92 according to the present embodiment. If the first cover member 91 and the second cover member 92 are removed, the viscoelastic member B adheres to the optical housing 90 and is sometimes separated from the cover members 91 and 92 that are the attached members. In this case, it is difficult to attach the viscoelastic member B, which has been separated from the cover members 91 and 92, to the cover members 91 and 92 again; therefore, the entire image forming apparatus needs to be replaced, which is not preferable in terms of the cost burden on users.

Furthermore, it is possible to apply an adhesive, such as a double-sided tape, between the attached member and a seal member, which is an elastic body such as sponge. With this configuration, an elastic body, such as sponge, is in contact with an attachment target member, such as an optical housing; therefore, when the deflector or the light source is replaced, the seal member is not separated from the attached member.

However, the seal member that includes sponge, or the like, used to ensure the sealing performance is typically made of foamed polyurethane (foamed PU), or the like, and therefore hydrolysis occurs due to water (moisture), or the like, with the passage of time. If hydrolysis occurs in the foamed PU, the joints of the seal member that includes sponge, or the like, are separated, and the fragments thereof are dropped in the surroundings. Then, there is a possibility that the seal member in fragments enters the image forming apparatus as a foreign matter. As a result, there is the problem of the occurrence of faulty images, such as image voids.

Furthermore, as seal members with a double-sided tape are typically formed by performing punching processing on a large sheet, the shape of the seal member is often complicated. Therefore, the number of seal members that can be obtained from a single sheet of a basic size is small, and the yield rate is low.

Furthermore, there is a problem in that, as seal members with a double-sided tape are often configured to be split, the gap that occurs in the joint line between seal members during assembling cannot be completely removed, and the sealing performance is insufficient. The invention according to the present embodiment also solves this problem.

Figure 7:
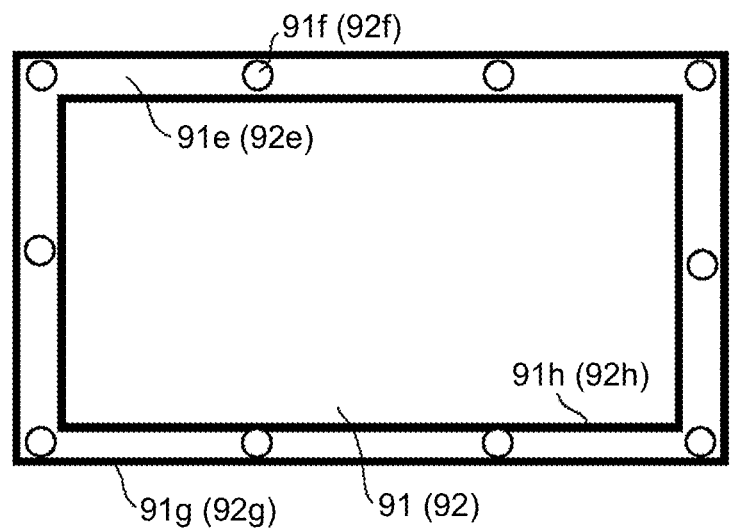
FIG. 7 is an explanatory diagram that illustrates a cover member of the image forming apparatus that is illustrated in FIG. 1.
Figure 8:
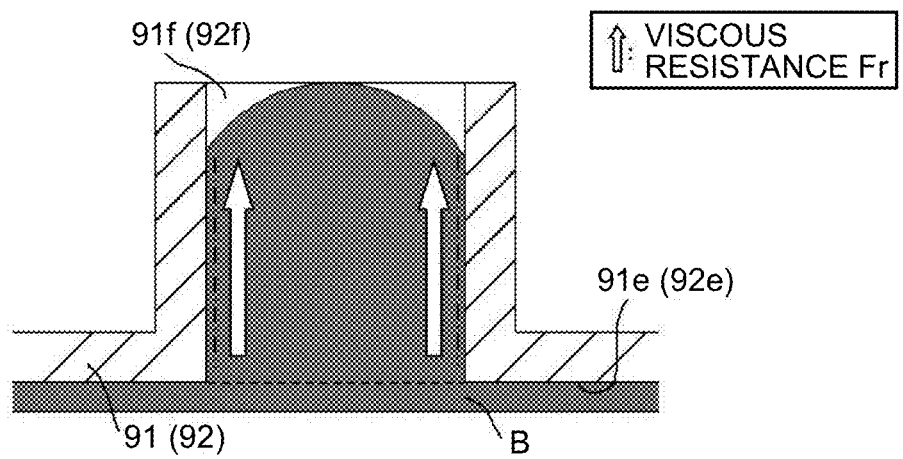
FIG. 8 is an explanatory diagram that illustrates a cover member of the image forming apparatus that is illustrated in FIG. 1.

As illustrated in FIGS. 7 and 8, multiple holes 91f and 92f are provided on the attached surfaces 91e and 92e of the cover members 91 and 92. Specifically, the holes 91f, 92f are provided between the outer wall sections 91g, 92g and the inner wall sections 91h, 92h on the bottom section. The holes 91f and 92f have a cylindrical shape that protrudes toward the opposite side of the attached surfaces 91e and 92e. That is, the holes 91f and 92f have a cylindrical shape that protrudes in the thickness direction of the bottom section and in the direction that is opposite to the direction in which the outer wall sections 91g and 92g exist. Here, the shape of the holes 91f and 92f is not limited to the cylindrical shape. Furthermore, there is no limitation on the configuration such that the holes 91f and 92f are provided on the attached surfaces 91e and 92e, and, for example, they may be provided on the outer wall sections 91g and 92g or the inner wall sections 91h and 92h.

The viscoelastic member B is injected into the attached surfaces 91e and 92e by a melter, or the like, so that the viscoelastic member B enters the holes 91f and 92f. Furthermore, after the viscoelastic member B is poured into the attached surfaces 91e and 92e, the cover members 91 and 92 are assembled in the optical housing 90, and the cover members 91 and 92 are pressed, whereby part of the optical housing 90 presses the viscoelastic member B. Then, the viscoelastic member B moves farther into the holes 91f and 92f. That is, the viscoelastic member B moves farther toward the openings of the holes 91f and 92f on the opposite side of the attached surfaces 91e and 92e.

Figure 9:
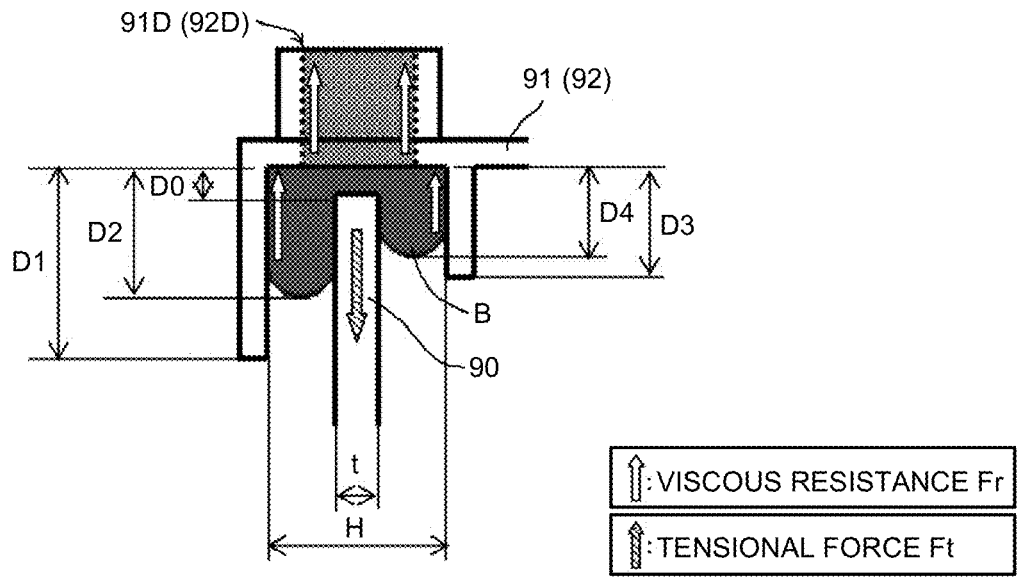
FIG. 9 is an explanatory diagram that illustrates a sealing structure of the image forming apparatus that is illustrated in FIG. 1.

If the first cover member 91 and/or the second cover member 92 are removed from the optical housing 90 in the above state, the viscoelastic member B is pulled by the optical housing 90 as it is in contact with the optical housing 90. Then, as illustrated in FIG. 9, a tensional force Ft acts on the viscoelastic member B in a direction away from the attached sections of the first cover member 91 and/or the second cover member 92.

Furthermore, as the viscoelastic member B is in contact with the attached sections of the cover members 91, 92, i.e., the outer wall sections 91g, 92g, the inner wall sections 91h, 92h, the attached surfaces 91e, 92e, and the holes 91f, 92f, a resistive force (viscous resistance) Fr acts against the tensional force Ft for pulling by the optical housing 90. In the holes 91f and 92f, as indicated by a dashed line in FIG. 9, a shear stress occurs between the cylindrical inner surface and the viscoelastic member B; therefore, the tensional force Ft by the optical housing 90 does not exceed the resistive force by the attached sections of the cover members 91 and 92.

The viscoelastic member B is not separated from the cover members 91 and 92 that are the attached members; therefore, when the cover members 91 and 92 are removed from the optical housing 90, the cover members 91 and 92 to which the viscoelastic member B is attached can be used again.

As a foamed PU is not used for the viscoelastic member B, hydrolysis does not occur, and the seal member in fragments does not enter the image forming apparatus as a foreign matter. Furthermore, as the viscoelastic member B is not formed by performing punching processing on a large sheet, there is no problem of the yield rate. Furthermore, as the viscoelastic member B is not configured to be split, no joint line is present, and the sealing performance can be maintained. Here, the cylindrical inner surface of the holes 91f and 92f may have a projected shape. With the provision of the projected shape, the viscoelastic member B is attached to the cover members 91 and 92 more tightly.

Furthermore, in a case where the holes 91f, 92f are not provided on the attached surfaces 91e, 92e of the cover members 91, 92 or are provided on only part of them, if part of the viscoelastic member B is separated, separation is spread to the other parts; thus, separation is made in due course.

The cover members 91 and 92 according to the present embodiment are provided with the multiple holes 91f and 92f. It is preferable that the holes 91f and 92f are provided at an equal installation interval. As the cover members 91 and 92 are provided with the holes 91f and 92f, even if part of the viscoelastic member B is separated, the spread of separation can be reduced to a minimum.

Furthermore, if there is no gap D0 between the optical housing 90 and the cover members 91, 92, chattering occurs between the optical housing 90 and the cover members 91, 92 due to the oscillation of the image forming apparatus 1, or the like, and therefore there is a possibility of the occurrence of faulty images.

The gap D0 is provided between the cover members 91, 92 according to the present embodiment and the optical housing 90. As the gap D0 is provided, the occurrence of faulty images due to chattering can be prevented.

Furthermore, a length (height) D1 of the outer wall sections 91g, 92g of the cover members 91, 92 from the attached surfaces 91e, 92e is greater than a length (molding height) D2 of the part of the viscoelastic member B that is in contact with the outer wall sections 91g, 92g from the attached surfaces 91e, 92e. A length (height) D3 of the inner wall sections 91h, 92h of the cover members 91, 92 from the attached surfaces 91e, 92e is greater than a length (molding height) D4 of the part of the viscoelastic member B that is in contact with the inner wall sections 91h, 92h from the attached surfaces 91e, 92e.

With the above configuration, the viscoelastic member B is in contact with the cover members 91 and 92 without being escaped, whereby the separation of the viscoelastic member B can be prevented more effectively.

Figure 10:
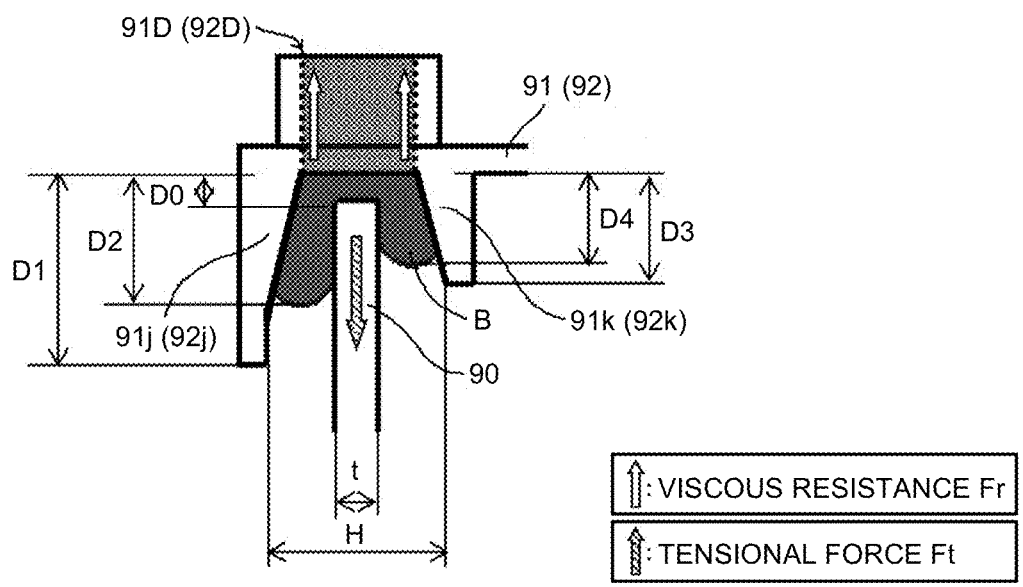
FIG. 10 is an explanatory diagram that illustrates a sealing structure of the image forming apparatus that is illustrated in FIG. 1.

As illustrated in FIG. 10, it is preferable that the outer wall sections 91g, 92g and the inner wall sections 91h, 92h are provided with multiple rib shapes 91j, 91k, 92j, and 92k that are the guide shapes for enabling the cover members 91, 92 to be guided to predetermined positions of the optical housing 90. The rib shapes 91j, 91k, 92j, and 92k are, for example, triangle rib shapes. As the outer wall sections 91g, 92g and the inner wall sections 91h, 92h are provided with the rib shapes 91j, 91k, 92j, and 92k, the cover members 91, 92 can be located at appropriate positions of the optical housing 90. Thus, the viscoelastic member B can move to the side of the outer wall sections 91g, 92g, and therefore D2>D0>0, and D4>D0>0, whereby the adhesiveness between the cover members 91, 92 and the optical housing 90 can be maintained.

Here, a width t of the area of the optical housing 90 that is in contact with the cover members 91, 92 and a distance H between the outer wall sections 91g, 92g of the cover members 91, 92 and the inner wall sections 91h, 92h need to be H>t.

According to an embodiment, it is possible to provide a chassis structure that has a simple configuration and that ensures the sealing performance of a chassis with the passage of time.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A chassis structure comprising:
 a box-shaped chassis, having a peripheral wall, that houses a component used for an image forming apparatus inside and that includes an opening;
 a cover member that covers the opening of the chassis; and
 a seal member that is provided between the cover member and the chassis and that, when the cover member is attached to the chassis, is compressed and deformed so as to seal a gap between the cover member and the chassis, wherein
 an attached section of the cover member to which the seal member is attached is provided with at least one through hole, wherein
 the cover member includes
  a bottom surface,
  an outer wall section that protrudes from an outer peripheral edge of the bottom surface, and
  an inner wall section that protrudes from the bottom surface and is provided interiorly to the outer wall section, the seal member being in surface contact with the outer wall section and the inner wall section, wherein the peripheral wall of the chassis is between the inner and outer wall sections of the cover member.

2. The chassis structure according to claim 1, wherein the attached section of the cover member is a section that is surrounded by the bottom surface, the outer wall section, and the inner wall section.

3. The chassis structure according to claim 1, wherein the at least one through hole is provided on the bottom surface between the outer wall section and the inner wall section.

4. The chassis structure according to claim 1, wherein the at least one through hole has a shape that protrudes in a thickness direction of the bottom surface and in a direction that is opposite to a direction in which the outer wall section protrudes.

5. The chassis structure according to claim 1, wherein the outer wall section and/or the inner wall section has a guiding shape that enables the cover member to be guided to a predetermined position of the chassis.

6. The chassis structure according to claim 1, wherein the seal member is in contact with the outer wall section of the cover member and a molding height of the seal member that is in contact with the outer wall section of the cover member is greater than a gap between the chassis and the cover member in a thickness direction of the bottom section.

7. The chassis structure according to claim 1, wherein the seal member is in contact with the inner wall section of the cover member and a molding height of the seal member that is in contact with the inner wall section of the cover member is greater than a gap between the chassis and the cover member in a thickness direction of the bottom section.

8. The chassis structure according to claim 1, wherein the seal member is a viscoelastic member.

9. The chassis structure according to claim 1, wherein the attached section includes multiple through holes.

10. The chassis structure according to claim 1, wherein the cover member includes at least one cover member.

11. An optical scanning device comprising:
a light source;
a deflecting unit that deflects a light flux in a main-scanning direction for scanning, the light flux being emitted from the light source; and
a plurality of optical elements that guides the light flux to a scanned surface, the light flux being deflected by the deflecting unit, wherein
the light source, the deflecting unit, and the optical elements are housed in a chassis, and
the chassis structure according to claim 1.

12. The optical scanning device according to claim 11, wherein the light source includes at least one luminous point.

13. The optical scanning device according to claim 11, wherein the light source is a surface-emitting laser.

14. An image forming apparatus comprising the chassis structure according to claim 1.

15. The image forming apparatus according to claim 14, wherein the image forming apparatus forms a raster image.

16. The chassis structure according to claim 1, wherein a wall of the chassis is received in a gap between the outer wall section and the inner wall section.

17. The chassis structure according to claim 1, wherein the peripheral wall of the chassis has parallel side surfaces and the seal member is in surface contact with the parallel side surfaces.

18. The chassis structure according to claim 1, wherein the seal member is in contact with the inner and outer wall sections of the cover member and an end surface of the peripheral wall of the chassis that face the cover member.

19. The chassis structure according to claim 1, wherein the inner and outer wall sections of the cover member have a height greater than a molding height of the seal member.

20. The chassis structure according to claim 1, wherein the sealing member is at least partially received in the at least one through hole in the cover member.

* * * * *